United States Patent [19]

Faroudja et al.

[11] Patent Number: 5,844,617
[45] Date of Patent: Dec. 1, 1998

[54] METHOD AND APPARATUS FOR ENHANCING THE VERTICAL RESOLUTION OF A TELEVISION SIGNAL HAVING DEGRADED VERTICAL CHROMINANCE TRANSITIONS

[75] Inventors: Yves C. Faroudja, 26595 Anacapa Dr., Los Altos Hills, Calif. 94022; Dong Xu, San Jose, Calif.

[73] Assignee: Yves C. Faroudja, Los Altos Hills, Calif.

[21] Appl. No.: 562,279

[22] Filed: Nov. 22, 1995

Related U.S. Application Data

[63] Continuation-in-part of Ser. No. 539,815, Oct. 5, 1995, abandoned.

[60] Provisional application Nos. 60/005,114 Oct. 12, 1995 and 60/004,905 Oct. 6, 1995.

[51] Int. Cl.$^6$ ...................................................... H04N 7/13
[52] U.S. Cl. .......................... 348/441; 348/451; 348/452; 348/457; 348/458
[58] Field of Search ..................................... 348/627, 701, 348/424, 441, 444, 446, 450–453, 457–459, 625, 628, 629, 630, 631; H04N 7/13

[56] References Cited

U.S. PATENT DOCUMENTS

| | | |
|---|---|---|
| 2,740,071 | 3/1956 | Goldmark et al. . |
| 2,851,522 | 9/1958 | Hollywood . |
| 4,030,121 | 6/1977 | Faroudja ................................. 348/625 |
| 4,262,304 | 4/1981 | Faroudja ................................. 348/625 |
| 4,504,853 | 3/1985 | Faroudja ................................. 348/628 |
| 4,531,151 | 7/1985 | Hentschke .............................. 348/424 |
| 4,772,949 | 9/1988 | Nadan ..................................... 348/389 |
| 4,847,681 | 7/1989 | Faroudja et al. ...................... 348/625 |
| 4,876,596 | 10/1989 | Faroudja ................................. 348/480 |
| 4,967,271 | 10/1990 | Cambell et al. ....................... 348/701 |
| 4,982,280 | 1/1991 | Lyon et al. ............................. 348/448 |
| 4,989,090 | 1/1991 | Campbell et al. ..................... 348/451 |
| 5,014,119 | 5/1991 | Faroudja ................................. 348/613 |
| 5,151,783 | 9/1992 | Faroudja ................................. 348/448 |
| 5,237,414 | 8/1993 | Faroudja ................................. 348/606 |
| 5,400,077 | 3/1995 | Cookson et al. . |
| 5,428,398 | 6/1995 | Faroudja . |

FOREIGN PATENT DOCUMENTS

| | | |
|---|---|---|
| 0318760 | 11/1988 | European Pat. Off. . |
| 0408460 | 7/1990 | European Pat. Off. . |
| 9512275 | 5/1995 | WIPO . |
| 9512283 | 5/1995 | WIPO . |

OTHER PUBLICATIONS

"High Definition Television Studies on Compatible Basis with Present Standards" B. Wendland; *Television Technology in the 80's* Feb. 1981 pp. 151–165.

(List continued on next page.)

*Primary Examiner*—Glenton B. Burgess
*Attorney, Agent, or Firm*—Gallagher & Lathrop; Thomas A. Gallagher

[57] ABSTRACT

A received 4-2-0 format, 2-1 interlaced digital component video signal is upconverted to a 4-2-2 format, 2-1 interlaced digital component video signal and a vertical chrominance bandwidth expansion enhancement signal is combined with the chrominance components in order to more closely simulate the wider bandwidth vertical chrominance resolution of the original 4:2:2 format signal from which the 4:2:0 format signal was derived. In a first embodiment, the vertical chrominance enhancement signal is derived from vertical transitions in the luminance component of the 4:2:0 format signal. In a second embodiment, the vertical chrominance enhancement signal is derived from vertical transitions in the luminance component of the 4:2:0 format signal when such vertical transitions are present and, in the absence of a luminance transition, the vertical chrominance enhancement signal is derived from the sampling-rate-reduced chrominance components of the 4:2:0 format signal. In all embodiments, the vertical chrominance enhancement signal is a "bandwidth enhancement" signal which simulates a wide bandwidth vertical detail signal. The vertical chrominance detail signal is self-service from the 4:2:0 format video signal itself and requires no auxiliary signal to be transmitted or stored.

7 Claims, 4 Drawing Sheets

OTHER PUBLICATIONS

"Picture Enhancement for PAL–coded TV Signals by Digital Processing in TV Receivers," Michael Jacobsen; *SMPTE Journal,* Feb. 1983, pp. 164–169.

"High–Definition Television and Compatibility with Existing Standards" C.P. Sandbank, M.E.B. Moffat; *SMPTE Journal,* May 1983 Part 1, pp. 552–561.

"Compatible Systems for High–Quality Television", R.N. Jackson, M.J. Annegarn; *SMPTE Journal,* Jul. 1983, pp. 719–723.

"Extended Definition Television with High Picture Quality" Broder Wendlund; *SMPTE Journal,* Oct. 1983, pp. 1028–1035.

"Signal Processing for New HQTV Systems" Broder Wendland, Hartmut Schröder; Television Image Qualty, *SMPTE Journal,* Scarsdale, 1984, pp. 336–353.

"The Evolution of High–Definition Television" John P. Freeman; *SMPTE Journal,* May 1984 Part 1, pp. 492–501.

"The Television Scanning Process," G.J. Tonge; *SMPTE Journal,* Jul. 1984, pp. 657–666.

"On Picture Quality of Some Television Signal Processing Techniques" Broder Wendland, Hartmut Schröder; *SMPTE Journal,* Oct. 1984, pp. 915–922 (cited in specification).

"Experiments on Proposed Extended–Definition TV with Full NTSC Compatibility" Takahiko Fukinuki, Yasuhiro Hirano, Hiroshi Yoshigi; *SMPTE Journal,* Oct. 1984, pp. 923–929.

"Scanning Modes for Flicker–Free Colour TV–Reproduction" H. Schroder, M. Silverberg, B. Wendland, G. Huerknamp; *IEEE Transactions on Consumer Electronics* 1985, pp. 627–641.

"Signal Processing for New HQTV Systems" Broder Wendland, Hartmut Schröder; *SMPTE Journal* Feb. 1985, pp. 182–189.

"The Kell Factor: Past and Present" Stephen C. Hsu; *SMPTE Journal,* Feb. 1986, pp. 206–214.

"Improving NTSC to Achieve Near–RGB Performance" Yves Faroudja, Joseph Roizen; *SMPTE Journal,* Aug. 1987, pp. 750–761.

"A Proposal for a New High–Definition NTS Broadcast Protocol" Richard Iredale; *IEEE Transactions on Consumer Electronics,* Feb. 1987, pp. 14–27.

"NTSC and Beyond," Yves Faroudja; *IEEE Transactions on Consumer Electronics,* Feb. 1988, pp. 166–177.

"NTSC Y/C Separation and Enhancement Technique with Two Dimensional Adaptive Features" M. Itoga, H. Itoh, T. Kasezawa, M. Yao; *IEEE Transactions on Consumer Electronics,* Feb. 1988, pp. 194–204.

"Enhancing Television—An Evolving Scene" John L. E. Baldwin; *SMPTE Journal,* May 1988, pp. 374–377.

"Improving TV Picture Quality with Linear–Median Type Operations" J. Salo, Y. Neuvo, V. Hameenaho; *IEEE Transactions on Consumer Electronics,* Aug. 1988 pp. 373–379.

"A Practical IDTV System Improving Picture Quality for Nonstandard TV Signals" Toshiyuki Kurita, I. Arai, N. Nakagaki, T. Murata; *IEEE Transactions on Consumer Electronics,* Aug. 1988 pp. 387–396.

"Integrated Digital IDTV Receiver with Features" S. Naimpally, et al.; *IEEE Transactions on Consumer Electronics,* Aug. 1988 pp. 410–419.

"3XNTSC–A 'Leapfrog' Production Standard for HDTV" Wayne Bretl; *IEEE Transactions on Consumer Electronics* Aug. 1988 pp. 484–492.

"System & Technological Details of Terrestrial/Cable NTSC Compatible HDTV" Alan Cavallerano; *IEEE Transactions on Consumer Electronics,* Aug. 1989 pp. 227–238.

"Comparison Between Median Filtering and Vertical Edge Controlled Interpolation for Flicker Reduction" Dipl. Ing C. Hentschel; *IEEE Transactions on Consumer Electronics* Aug. 1989 pp. 279–289.

"A Progress Report on Improved NTSC," Yves C. Faroudja, Joseph Roizen; *SMPTE Journal,* Nov. 1989, pp. 817–822.

"NTSC Image Improvements Using Basic Inter and Intra/Frame Signal Processing" Carl Markhauser; *IEEE Transactions on Consumer Electronics,* Nov. 1989, pp. 863–871.

*System Description SueprNTSC,* Faroudja Research Enterprises; Mar. 1990 Section I, II, IV,& V.

"Motion Adaptive Field Rate Upconversion Algorithms for 900 Lines/100 Hz/2:1 Displays" David Gillies, Martin Plantholt, Dietrich Westerknamp; *IEEE Transactions on Consumer Electronics,* May 1990 pp. 149–160.

"High–Definition Transmission, Signal Processing and Display," William Glenn, Karen Glenn; *SMPTE Journal,* Jul. 1990, pp. 538–541.

"ATV/NTSC Format Converters" W. Bretl; *IEEE Transactions on Consumer Electronics,* Aug. 1990 pp. 269–283.

"An Interlaced to Progressive Scan Converter for Improved Pal Systems" A. Biasiolo, G. Cortelazzo, G. Mian; *IEEE Transactions on Consumer Electronics,* Aug. 1990 pp. 284–290.

"Video Tape Recorder with Digital Television Standards Converter" M. Tomita, T. Ohtsuki, S. Ogata, H. Niwa; *IEEE Transactions on Consumer Electronics,* Aug. 1990 pp. 572–579.

"Line Rate Upconversion in IDTV Applications" Pasi Pohjala, Matti Karlsson; *IEEE Transactions on Consumer Electronics,* Aug. 1991 pp. 309–312.

"Multi–Picture System for High Resolution Wide Aspect Ratio Screen" Susumu Tsuchida, Chisato Yoshida; *IEEE Transactions on Consumer Electronics,* Aug. 1991 pp. 313–319.

"Interlace to Progressive Scan Converter for IDTV" P. Filliman, T. Christopher, R. Keen; *IEEE Transactions on Consumer Electronics,* Aug. 1992 pp. 135–144.

"A Motion–Adaptive De–Interlacing Method" Soon–kak Kwon, Kang–soo Seo, Jae–kyoon Kim, Yung–gil Kim; *IEEE Transactions on Consumer Electronics,* Aug. 1992 pp. 145–150.

"Development of Picture Converting System Applying an NTSC Signal to a Wide Aspect Display" Kenji Katsumata, et al.; *IEEE Transactions on Consumer Electronics,* Aug. 1992 pp. 303–312.

"Muse–525 Progressive Scan Converter" Hiroyuki Nakayama, Yoshiki Mizutani, Hiroshi Yamamoto; *IEEE Transactions on Consumer Electronics,* Aug. 1992 pp. 313–318.

"A Study of Interpolation Filter for Muse Decoder" N. Itoh et al.; *IEEE Transactions on Consumer Electronics,* Aug. 1992 pp. 563–569.

"Digital Compatible HDTV Using Upconverted NTSC Video" Paul Snopko, Jong Kim; *SMPTE Journal,* Mar. 1993, pp. 186–189.

"Scan Conversion Between 1050 2:1 60 HZ and 525 1:1 30 HZ U and V Color Components" Eberhard Fisch; *IEEE Transactions on Consumer Electronics,* Aug. 1993 pp. 210–218.

"Video Format Conversions Between HDTV Systems" Dong–Ho Lee, Jong–Seok Park, Yung–Gil Kim; *IEEE Transactions on Consumer Electronics,* Aug. 1993 pp. 219–224.

"A Deinterlacer for IQTV Receivers and Multimedia Applications" R. Simonetti, et al. *IEEE Transactions on Consumer Electronics,* Aug. 1993 pp. 234–240.

"Interlaced to Progressive Scan Conversion With Double Smoothing" H. Hwang, M. Lee, D. Song; *IEEE Transactions on Consumer Electronics,* Aug. 1993 pp. 241–246.

"A Digital Display Processor with Integrated 9 Bit Triple DAC for Enhanced TV Applications" Hubert Pernull, Dieter Draxelmayr; *IEEE Transactions on Consumer Electronics* Aug. 1993 pp. 247–254.

"An Audio Compression System Using Modified Transform Coding and Dynamic Bit Allocation" Yung–Cheng Sung, Jar–Ferr Yang; *IEEE Transactions on Consumer Electronics,* Aug. 1993 pp. 255–259.

"A New Algorithm for Interlaced to Progressive Scan Conversion Based on Directional Correlations and Its IC Design" Myeong–Hwan Lee, et al.; *IEEE Transactions on Consumer Electronics* May 1994 pp. 119–129.

"High Resolution Muse–NTSC Converter" H. Nakayama, E. Arita, Y. Mizutani, K. Tsunashima; *IEEE Transactions on Consumer Electronics* Aug. 1994 pp. 199–206.

"A Palplus Compatible HDTV Encoder System" G. Shmidt, L.S. Dooley, W.P. Buchwald, *IEEE Transactions on Consumer Electronics* Aug. 1994 pp. 207–215.

"An NTSC to HDTV Video Conversion System by Using the Block Processing Concept" Shih–Chang Hsia, et al.; *IEEE Transactions on Consumer Electronics,* Aug. 1994, pp. 216–224.

"Edge and Motion Controlled Spatial Upconversion" Jouni Salonenp; *IEEE Transactions on Consumer Electronics,* Aug. 1994, pp. 225–233.

"A Highly Integrated Scanning Rate Converter for IQTV" V. D'Alto et al.; *IEEE Transactions on Consumer Electronics,* Aug. 1994, pp. 727–734.

"Motion Adaptive Deinterlacer for DMD (Digital Micromirror Device) Based Digital Television" V. Markandey, et al.; *IEEE Transactions on Consumer Electronics,* Aug. 1994 pp. 735–740.

"Subjective Assessment of Various Methods for Scan Conversion" Christian Hentschel; *IEEE Transactions on Consumer Electronics,* Feb. 1995 pp. 65–72.

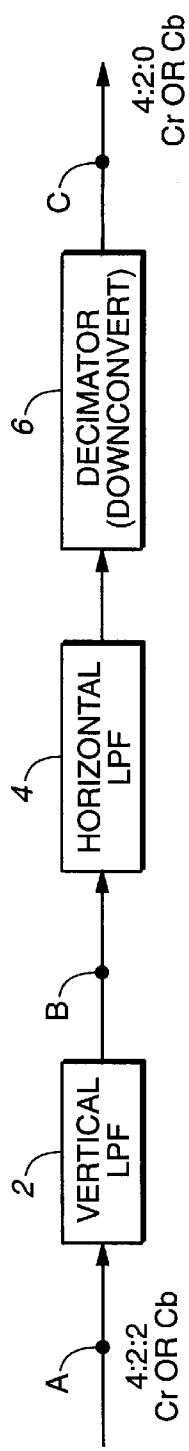
FIG._1A
*(PRIOR ART)*
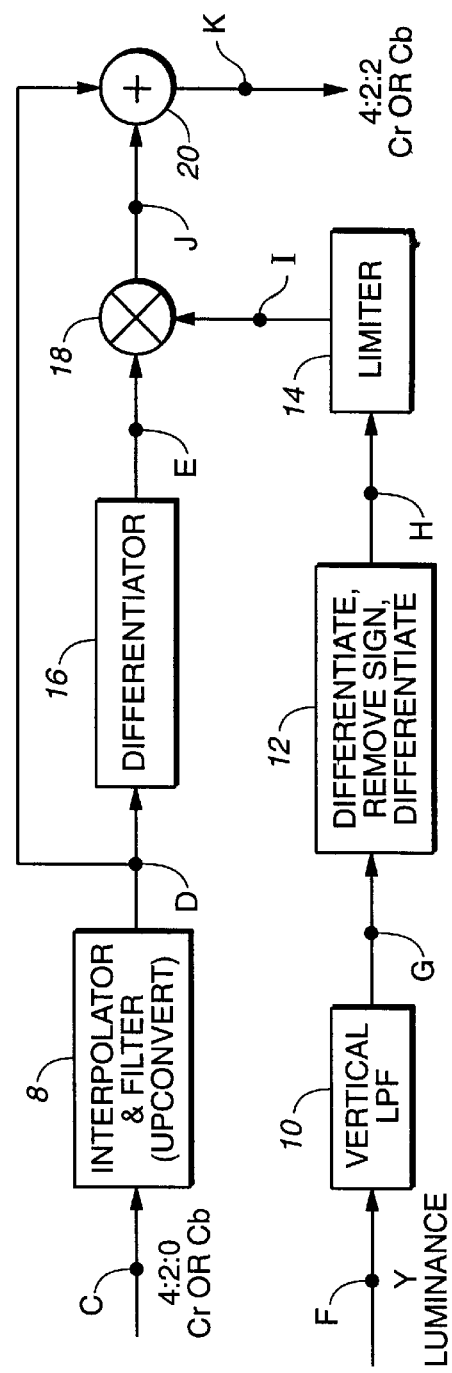
FIG._1B

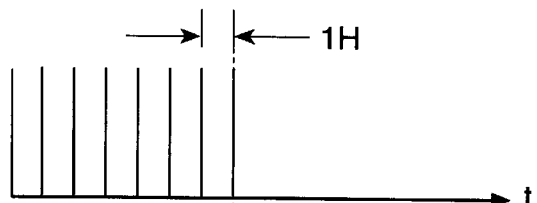
FIG._2A
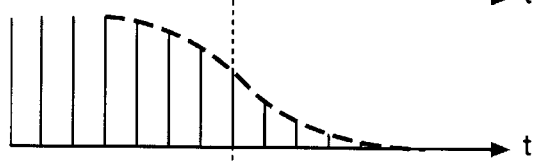
FIG._2B
FIG._2C
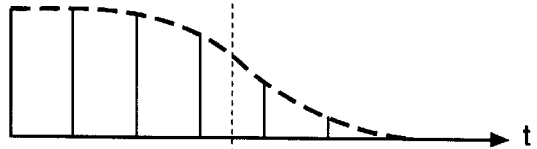
FIG._2D
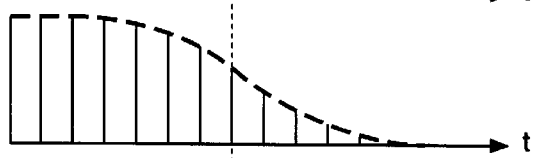
FIG._2E
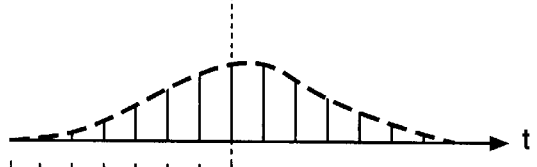
FIG._2F
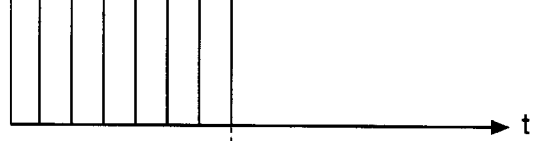
FIG._2G
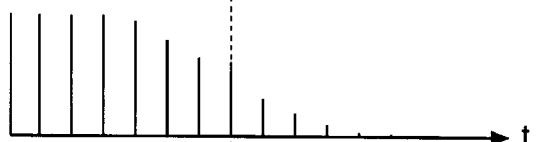
FIG._2H
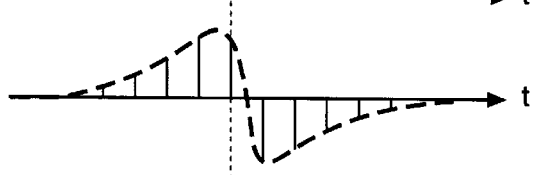
FIG._2I
FIG._2J
FIG._2K
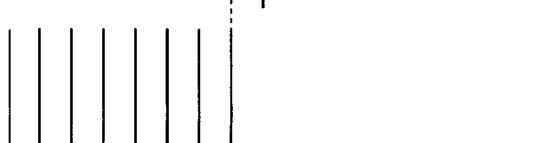

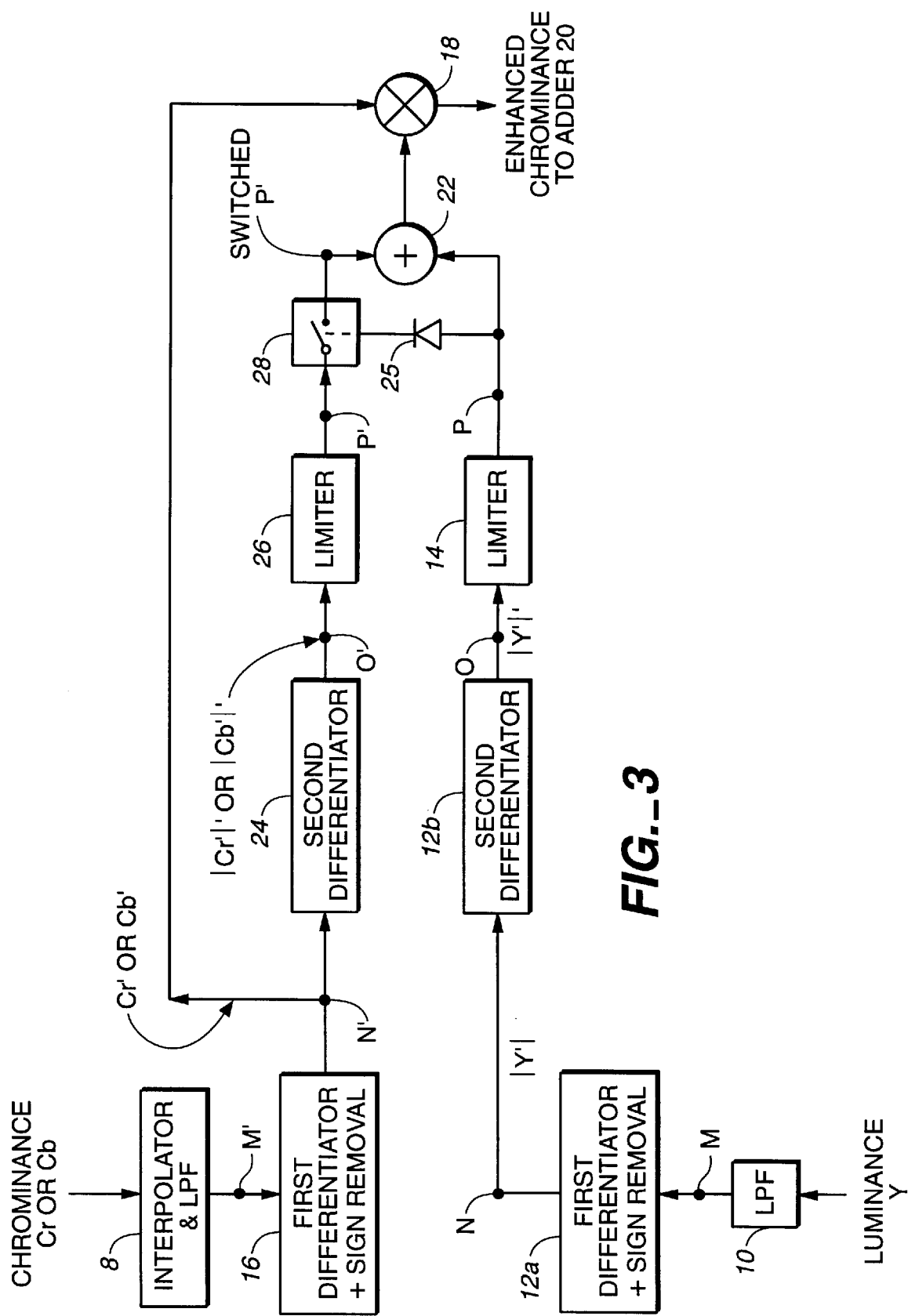
FIG._3

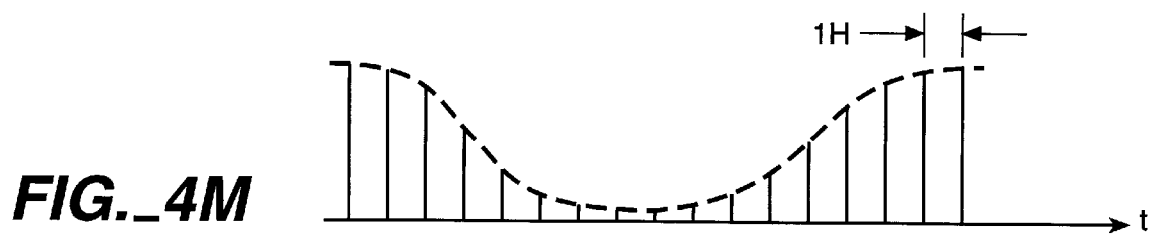
FIG._4M
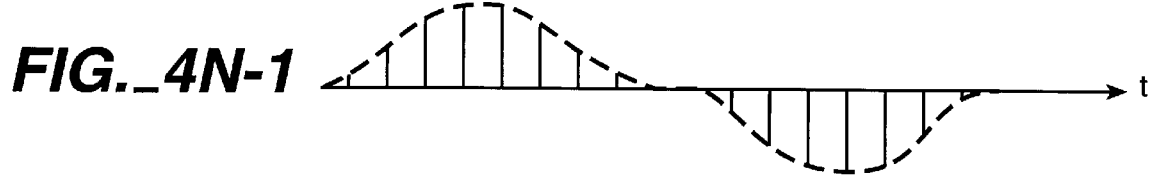
FIG._4N-1
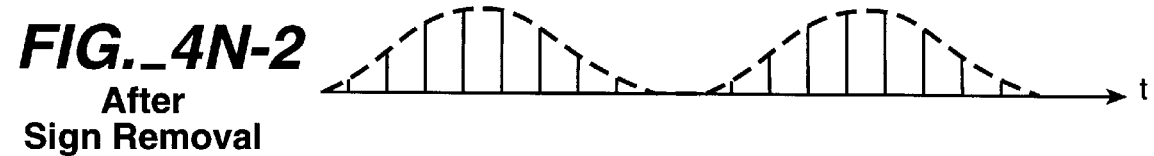
FIG._4N-2
After
Sign Removal
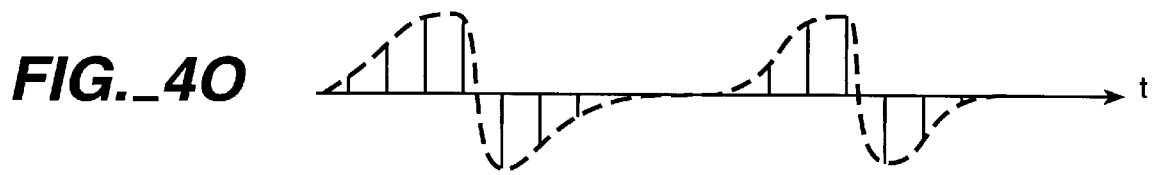
FIG._4O
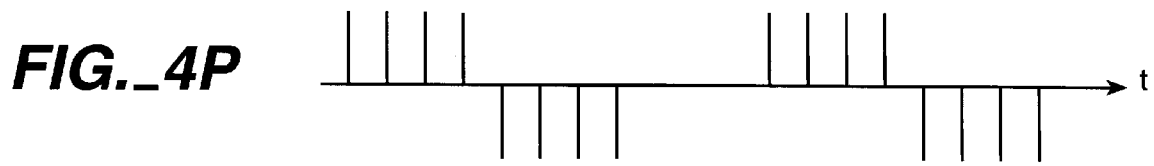
FIG._4P
FIG._4Q
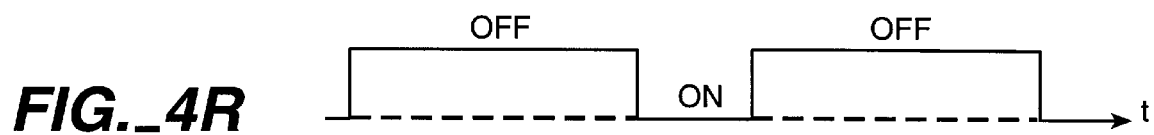
FIG._4R

METHOD AND APPARATUS FOR ENHANCING THE VERTICAL RESOLUTION OF A TELEVISION SIGNAL HAVING DEGRADED VERTICAL CHROMINANCE TRANSITIONS

CROSS REFERENCE TO RELATED APPLICATIONS

This application is a continuation-in-part of U.S. application Ser. No. 08/539,815, filed Oct. 5, 1995, now abandoned and claims benefit of priority of U.S. Provisional Applications Ser. No. 60/005,114, filed Oct. 12, 1995, and Ser. No. 60/004,905, filed Oct. 6, 1995.

FIELD OF THE INVENTION

The present invention relates to television signal processing. More particularly, the present invention relates to improved signal processing apparatus and methods for enhancing the vertical resolution of a television signal having degraded vertical chrominance transitions, for example a 4:2:0 format digital component video signal. The apparatus and method may be part of an arrangement for converting a 4:2:0 format digital component video signal back to a CCIR 601 (4:2:2) format digital component video signal, such that the reconstituted 4:2:2 format signal when reproduced provides a vertical chrominance resolution psychovisually comparable to the original 4:2:2 format digital component video signal from which the 4:2:0 format signal was derived and is relatively free of psychovisually objectionable artifacts.

DESCRIPTION OF RELATED ART

A hierarchy of digital component video formats are coming into increasing use. The formats are still evolving in accordance with the recommendations, standards and compression algorithms of the CCIR (International Radio Consultative Committee), ISO/MPEG (the Motion Picture Experts Group of the International Standards Organization), SMPTE (Society of Motion Picture and Television Engineers), EBU (European Broadcasting Union), and other industry, governmental and quasi-governmental bodies.

Initially developed as a studio-level interface in accordance with CCIR Recommendation 601, the 4:2:2 format has evolved as a standard. A 4:2:2 format signal is often referred to as a CCIR 601 signal. Under the hierarchy of digital component formats, the component video signals are luminance (Y) and two color difference signals (Cr and Cb), which are scaled and offset versions of the Y, R'--Y, and B'--Y, where R'- and B'- are gamma corrected red and blue. The digital component formats are compatible with various television signal standards, such as NTSC and PAL. For example, the PAL system's U and V chrominance components may be derived from the Cr and Cb signal components. In the 4:2:2 format, each chrominance signal is sampled at 6.75 MHz, half the 13.5 MHz sampling rate of the luminance signal.

In order to conserve transmission and storage bandwidth, CCIR 601 4:2:2 2-1 interlaced format signals are often downconverted to a data reduced digital component video format such as the 4:2:0 format in which the vertical chrominance scanning rate is halved, the 4:1:1 format in which the Cr and Cb sample rates are each halved, or the 2:1:1 format in which each of the Y, Cr and Cb sample rates are halved. Also, various ones of the data reduction schemes also convert the 2-1 interlaced format signals to a progressive scan format by interpolation, merging of fields or even by discarding every other field. For high quality reproduction, the data reduced format video signals preferably are upconverted back to the 4:2:2 2-1 interlaced format prior to display.

In the case of systems in which a 2-1 interlaced 4:2:2 format signal is downconverted to a 4:2:0 format 2-1 interlaced signal and then upconverted back to 4:2:2 format, the chrominance resolution in the resulting picture is visibly inferior to that of the original 4:2:2 format signal when reproduced on a high quality display, such as a direct view monitor with a small dot size or a projection system employing three monochrome color tubes.

Thus, there is an unfulfilled need for a reproduction system capable of reconstructing a video signal comparable to the original 4:2:2 format signal from a data-reduced 4:2:0 format signal without the production of visually undesirable artifacts.

SUMMARY OF THE INVENTION

In accordance with the teachings of the present invention, the vertical resolution of a television signal having degraded vertical chrominance transitions is enhanced. Although the principles of the invention are applicable in other environments, in the preferred embodiments a received 4-2-0 format, 2-1 interlaced digital component video signal is upconverted to a 4-2-2 format, 2-1 interlaced digital component video signal and a vertical chrominance bandwidth expansion enhancement signal is combined with the chrominance components in order to more closely simulate the wider bandwidth vertical chrominance resolution of the original 4:2:2 format signal from which the 4:2:0 format signal was derived.

In a first embodiment, the vertical chrominance enhancement signal is derived from vertical transitions in the luminance component of the 4:2:0 format signal. In a second embodiment, the vertical chrominance enhancement signal is derived from vertical transitions in the luminance component of the 4:2:0 format signal when such vertical transitions are present and, in the absence of a luminance transition, the vertical chrominance enhancement signal is derived from the sampling-rate-reduced chrominance components of the 4:2:0 format signal.

In all embodiments, the vertical chrominance enhancement signal is a "bandwidth enhancement" signal which simulates a wide bandwidth vertical detail signal. The vertical chrominance detail signal is self-derived from the 4:2:0 format video signal itself and requires no auxiliary signal to be transmitted or stored.

Spectral or bandwidth expansion in the vertical domain shortens the rise time of vertical transitions, sharpening the transitions without appreciable pre-shoot, overshoot or ringing. Spectral or bandwidth expansion may be provided by a non-linear enhancer which, at least for some signal transition amplitude levels, expands the bandwidth of the applied signal by controlled harmonic distortion of the original spectrum in the vertical domain. Harmonic distortion may be implemented by many forms of non-linear processing, including processing by multiplicative means and by gating means. Such devices are also known in the art by other nomenclature, including "video crispener" and signal processors providing "controlled harmonic generation," "spectral expansion," "shorter rise and fall times without preshoot and overshoot," "multiplicative enhancement" and "gated enhancement."

Examples of prior art spectral expansion are described in U.S. Pat. No. 2,740,071 to Goldmark and Reeves, U.S. Pat.

No. 2,851,522 to Hollywood, and in an article by Goldmark and Hollywood entitled "A New Technique for Improving the Sharpness of Television Pictures", *Proceedings of the IRE*, Oct. 1951, p. 1314. An improvement in non-linear spectral expansion techniques is set forth in the present inventor's prior U.S. Pat. No. 4,030,121 and other examples of non-linear signal enhancement are set forth in the present inventor's U.S. Pat. Nos. 4,504,853 and 5,014,119. The process is equally applicable in the horizontal and vertical dimensions. In his U.S. Pat. Nos. 5,151,783 and 5,237,414, the present inventor explains how non-linear enhancement may be applied in the vertical domain. Each of the aforementioned United States Patents cited in this paragraph is hereby incorporated by reference in its entirety.

BRIEF DESCRIPTION OF THE DRAWINGS

FIG. 1A is a block diagram of the chrominance processing portion of a prior art arrangement in which a 4:2:2 format digital component video signal is downconverted to a 4:2:0 format signal.

FIG. 1B is a block diagram of a first embodiment of the invention in which the vertical chrominance bandwidth expansion enhancement signal is derived from the luminance component of a received 4:2:0 format digital component video signal.

FIGS. 2A–2K are a series of idealized waveforms useful in understanding the operation of the embodiment of FIG. 1. The figures show picture amplitude samples in the vertical domain, wherein the amplitude is the ordinate (vertical coordinate) and time is the abscissa (horizontal coordinate), the samples being spaced the 1H, the time of a vertical scan line.

FIG. 3 is a block diagram of a second embodiment of the invention in which the vertical chrominance bandwidth expansion enhancement signal is derived from either the luminance component or the chrominance components of a received 4:2:0 format digital component video signal.

FIGS. 4M–4R are a series of idealized waveforms useful in understanding the operation of the embodiment of FIG. 3. FIGS. 4M–4Q show picture amplitude samples in the vertical domain, wherein the amplitude is the ordinate (vertical coordinate) and time is the abscissa (horizontal coordinate), the samples being spaced the 1H, the time of a vertical scan line. FIG. 4R is a timing diagram showing the on and off condition of a switch (ordinate) versus time (abscissa).

DESCRIPTION OF THE PREFERRED EMBODIMENTS

Referring now to FIGS. 1A along with the waveforms of FIGS. 2A–2C, FIG. 1A shows a functional block diagram -of the manner in which a standards committee (the "MPEG Committee") presently proposes to transform the multiplexed Cr and Cb chrominance components of a CCIR 601 (4:2:2) format digital component video signal in order to produce a 4:2:0 format digital component video signal. Although it is slightly modified, as explained in the paragraph below, the Y component signal is not downconverted and thus, for simplicity, the Y component channel is not shown.

In accordance with a proposed standard, to convert the CCIR 601 signal to 4:2:0 format, the signal is cropped from 720 luminance pels per line to 704 pels per line by removing 8 pels from the left and 8 pels from the right. Also, the 360 chrominance pels per line are cropped to 352 pels per line by removing 4 pels from the left and 4 pels from the right. Every pair of 2-1 interlaced luminance fields are merged (by means not shown) in their geometrical order to form a progressively-scanned frame.

FIG. 2A shows the sharp vertical transition in the chrominance components of the original 4:2:2 format signal (before or after cropping) at point A. In order to downconvert the chrominance vertical and horizontal scanning rates each by one half without generating undesirable aliasing, the chrominance signal components must be low pass filtered in the vertical domain prior to decimation. For certain standards (MPEG-1, SIF, CIF) it is also low pass filtered in the horizontal domain—it is not horizontally low pass filtered in the case of MPEG-2. Thus, the FIG. 2A waveform at point A is applied to a vertical domain low pass filter 2. In accordance with the proposed standard, low pass filter 2 comprises a 7-tap vertical filter which prefilters field 1, the filter having coefficients [−29, 0, 88, 138, 88, 0 −29]/256 and a 4 -tap vertical filter which prefilters field 2, the filter having coefficients of [1, 7, 7, 1]/16. As explained below, the filtered fields are subsequently vertically subsampled (decimated) by 2 and then may be merged (by means not shown) to form a progressively-scanned frame.

The output of the LPF 2 at point B is shown in FIG. 2B. Instead of occurring over only one vertical line, as in FIG. 2A, a transition now occurs over six or seven vertical lines (FIG. 2B), reducing the vertical resolution. The chrominance signals also are applied to a horizontal low pass filter 4, which affects horizontal bandwidth, which is not depicted in the vertical domain waveforms of FIGS. 2A–2K. After vertical low pass filtering, the chrominance signal components are decimated by one-half in the vertical direction by decimator 6. The effect of the vertical decimation is seen in FIG. 2C in which every second vertical sample is omitted, thus halving the vertical scanning rate. If horizontal low pass filtering is used, decimator 6 is also operating in the horizontal domain (one-half decimation).

The 4-2-0 format digital component video signals may be transmitted (wireless or wired transmission) or stored (videodisc, videotape, etc.). If desired, the components may be encoded into a composite format prior to transmission or storage. 4-2-0 format digital component video signals (after decoding from a composite form into components, if necessary) received from transmission or storage are converted back to 4-2-2 format prior to display.

In FIG. 1B, the received multiplexed 4-2-0 format chrominance components Cr and Cb are upconverted or upsampled by applying them to a vertical sample interpolator and filter arrangement 8 which double the vertical sampling rate. If the received signal has also been decimated by one-half in the horizontal domain, block 8 also applies horizontal sample interpolation and filtering in order to double the horizontal sampling rate. The waveform of FIG. 2D shows the interpolator and filter 8 output at point D having twice the vertical sampling rate of the input at point C (the waveform FIG. 2C). The horizontal sampling rate increase, if any, is not seen in the vertical domain waveform of FIG. 2D. The upconverted chrominance component signals (FIG. 2D) lack good vertical resolution as do the signals from which they are derived, the vertically low pass filtered chrominance signal components at point B (the waveform of FIG. 2B) of the 4:2:2 to 4:2:0 conversion arrangement of Figure 1A. On the other hand, the received 4:2:0 luminance signal components at point F have a robust, relatively noise free, and easy to filter, luminance component. Thus, the luminance transitions may beneficially be used in order to control the bandwidth expansion of chrominance vertical transitions, as is explained further below.

If the received signal components have been converted to a progressive scan format, the components may be converted back to 2-1 interlace (by means not shown) before vertical bandwidth expansion. However, when the original program source is progressively scanned (e.g., motion picture film), better results (a reduction of residual errors by a factor of about two) may be obtained by applying the vertical bandwidth expansion in a progressive scanning environment and to use low pass filters in the chrominance and luminance paths which are frame based rather than field based.

In order to help reduce aliasing artifacts in the reproduced enhanced vertical resolution display to a level which is not psychovisually disturbing, the luminance transitions used for generating the vertical bandwidth expansion control signal are first applied to a vertical domain low pass filter 10. The filter characteristic response of filter 10 is substantially that of the combined responses of filter 2 and the interpolation filter within upconverter 8 (i.e., the filters in series). Typically, the upconverter filter is a 3-pole, gaussian-type filter (coefficients of 1/4, 1/2, 1/4, for example). The output of vertical LPF 10 at point G is shown in the waveform of FIG. 2G. Instead of having a sharp, single line, transition, the vertical luminance transition now occurs over about six or seven vertical scanning lines. Processing in block 12 differentiates the applied low pass filtered luminance signal, takes the absolute value of the differentiated signal, thus removing its sign, and then differentiates once again to provide at its output point H a signal as shown in FIG. 2H. Because of the sign removal, the waveform shown in FIG. 2H will be generated whether the input transition (point F, waveform FIG. 2F) is from high to low amplitude (as shown) or vice-versa. The output of block 12 is then amplified and limited in block 14 to provide the output at point I shown in the waveform of FIG. 2I.

The signal at the output of block 14 is then applied to a multiplier 18 which controls the amplitude of the block 14 output signal. The multiplier control is derived in block 16 by differentiating the upconverted chrominance signal components, the output of the interpolator and filter 8 (point D, the waveform of FIG. 2D) to provide the output at point E, the waveform of FIG. 2E. Thus, for the input waveforms of FIGS. 2E and 2I, the output of the multiplier 18 at point J is the waveform of FIG. 2J, the vertical bandwidth expansion enhancement signal. The vertical enhancement signal is then additively combined with the upconverted chrominance signal components (the output of the interpolator and filter 8 at point D, the waveform of FIG. 2D) in summer 20 to provide an output signal at point K in accordance with the waveform of FIG. 2K. Thus, the resulting 4:2:0 to 4:2:2 converted chrominance components have a sharp chrominance transition as in the original 4:2:2 chrominance components prior to their conversion to 4:2:0 format.

However, not every chrominance transition has a corresponding luminance transition. Thus, it is preferred to provide also for chrominance transition enhancement at chrominance transitions which are not accompanied by a luminance transition. Thus, in an alternative embodiment, shown in FIG. 3, an arrangement for generating a chrominance component derived enhancement control signal is shown along with a switch for selecting the chrominance derived control signal in the absence of the occurrence of a corresponding luminance transition.

Referring to FIG. 3, along with the waveforms of FIGS. 4M–4R, like functional blocks are designated with the same reference numerals as in FIG. 1. The 4:2:0 format luminance signal components are applied to low pass filter (to provide an output signal at point M, the waveform of FIG. 4M) and then to blocks 12a and 12b, which show the functions of the FIG. 1 block 12 split into to parts. Waveform M shows two transitions, decreasing and then increasing in amplitude. Thus, the first differentiation results in the positive- and negative-going waveform of FIG. 2N, labeled as "first differentiation without sign removal." By taking the absolute value of the signal, the resulting output is the only positive-going waveform of FIG. 2N, labeled as "after sign removal." The output of block 12a is then differentiated again to provide the output at point O, the waveform of FIG. 4O. The second differentiated signal is applied to amplifier and limiter 14 to provide an output signal at point P, the waveform of FIG. 4P, which is applied to one input of an additive combiner 22 and to the input of a rectifier 25 which rectifies the signal and provides at an output at point Q shown in the waveform of FIG. 4Q.

The multiplexed Cr and Cb chrominance components are applied to the interpolator and low pass filter 8 to provide a signal at point M', which is essentially the same as the waveform, when a chrominance transition occurs, as the waveform of FIG. 4M, and then to a first differentiator and sign remover 16 as in the FIG. 1 embodiment to provide an output at point N', which has essentially the same waveform, when a chrominance transition occurs, as the waveform of FIG. 4N. Also, as in the FIG. 1 embodiment, the output of block 16 is applied to a multiplier 18 which is controlled by a enhancement control signal. However, in this FIG. 3 embodiment, unlike the FIG. 1 embodiment, the enhancement control signal is derived from a luminance transition if present, or, if there is a chrominance transition without a corresponding luminance transition, then from the chrominance signal components. Thus, in order to generate a control signal derived from the luminance components, the Output of block 16 is also applied to a second differentiator 24, the output of which at point O' has a waveform essentially the same as the waveform, when a chrominance transition occurs, as the waveform of FIG. 4O. The output of block 24 is also applied to an amplifier and limiter 26, which functions in the same way as block 14 to provide an output at point P' having essentially the same waveform, when a chrominance transition occurs, as the waveform of FIG. 4P. A switch 28 responds the rectified output of the diode 25 so as to be open ("off") when luminance derived vertical enhancement signals are present and closed ("on") when luminance derived vertical enhancement signals are not present, as shown in FIG. 4R. Thus, when luminance enhancement signals are present, the output of the luminance derived control signal channel, at the output of block 14, provides the control signal to multiplier 18. When no luminance-derived enhancement signals are present, any chrominance-derived enhancement signals are allowed to pass through switch 28 and provide the control signal to multiplier 18. The other input of multiplier 18 is the single differentiated and sign removed chrominance signal components from block 16 as in FIG. 1. The output of multiplier 18 is applied to combiner 20 which receives at its other input the upconverted chrominance signal components as in the FIG. 1 embodiment.

As a further alternative, control of vertical bandwidth expansion may be solely from vertical chrominance transitions. In that case, the arrangement of FIG. 3 is modified to omit the luminance control channel, the rectifier 25 and the combiner 22, so that the chrominance transition control signal from block 24 is applied directly to multiplier 18.

When chrominance low pass filtering and decimation are performed also in the horizontal domain (e.g., for certain forms of MPEG-1, HHR, SIF or CIF standards) (where "SIF" is "Source Interchange Format," "CIF" is "Common Intermediate Format," and "HHR" is "Half Horizontal Resolution), chrominance bandwidth expansion preferably is also applied in the horizontal domain in a similar manner to the vertical domain chrominance bandwidth expansion described above, controlling the horizontal chrominance bandwidth expansion by luminance transitions; by luminance or, in their absence, by chrominance transitions; or by chrominance transitions. The functional block diagrams of such arrangements are the same as shown except that vertical low pass filter 10 is replaced by a horizontal low pass filter. With respect to the waveforms of FIGS. 2 and 4, the vertical lines would represent clock signal edges in the horizontal domain rather than scanning lines in the vertical domain.

Although the invention has been described in the environment of 4:2:0 format to CCIR 601/4:2:2 format conversion, the invention is applicable more generally to enhancing the vertical chrominance transitions of signals other than 4:2:0 format signals which have degraded (e.g., softened) vertical transitions. In the manner described above, a bandwidth expansion control signal derived from vertical transitions in the luminance signal components may be used to control the bandwidth expansion of chrominance signal components. Alternatively, such bandwidth expansion of chrominance signal components may be controlled by a chrominance transition in the absence of a corresponding luminance transition.

The present invention may be implemented using digital hardware or digital signal processing in which functions are performed by hardware controlled by software and/or firmware. In principle, the invention may be implemented at least partially by analog devices, but such implementation is not preferred due to the added complexity and cost of converting to and from the analog domain.

We claim:

1. A method for enhancing the vertical chrominance transitions of a digital component video signal derived from a digital component video signal by downconverting the chrominance signal components to a lower vertical sampling rate, wherein the digital component video signal has luminance components having the same sampling rate as that of the digital component video signal from which it was derived, comprising upconverting the chrominance signal components to a higher vertical sampling rate commensurate with the sampling rate of the video signal from which the video signal chrominance components were downconverted, deriving a bandwidth expansion control signal from vertical transitions in the luminance signal components, bandwidth expanding the upconverted chrominance signal components in the vertical dimension, and controlling the bandwidth expansion of the upconverted chrominance signal components with said control signal.

2. A method for enhancing the vertical chrominance transitions of a digital component video signal derived from a digital component video signal by downconverting the chrominance signal components to a lower vertical sampling rate, comprising upconverting the chrominance signal components to a higher vertical sampling rate commensurate with the sampling rate of the video signal from which the video signal chrominance components were downconverted, deriving a bandwidth expansion control signal from vertical transitions in the upconverted chrominance signal components, bandwidth expanding the upconverted chrominance signal components in the vertical dimension, and controlling the bandwidth expansion of the upconverted chrominance signal components with the chrominance-derived control signal when a chrominance transition occurs.

3. A method for enhancing the vertical chrominance transitions of a digital component video signal derived from a digital component video signal by downconverting the chrominance signal components to a lower vertical sampling rate, wherein the digital component video signal has luminance components having the same sampling rate as that of the digital component video signal from which it was derived, comprising upconverting the chrominance signal components to a higher vertical sampling rate commensurate with the sampling rate of the video signal from which the video signal chrominance components were downconverted, deriving a bandwidth expansion control signal from vertical transitions in the luminance signal components, deriving a bandwidth expansion control signal from vertical transitions in the upconverted chrominance signal components, bandwidth expanding the upconverted chrominance signal components in the vertical dimension, and controlling the bandwidth expansion of the upconverted chrominance signal components (1) with the luminance-derived control signal when a luminance transition occurs, and (2) with the chrominance-derived control signal when a chrominance transition occurs in the absence of a luminance transition.

4. A method for enhancing the vertical and horizontal chrominance transitions of a digital component video signal derived from a digital component video signal by downconverting the chrominance signal components to a lower vertical and horizontal sampling rate, wherein the digital component video signal has luminance components having the same sampling rate as that of the digital component video signal from which it was derived, comprising upconverting the chrominance signal components to a higher vertical and horizontal sampling rate commensurate with the sampling rate of the video signal from which the video signal chrominance components were downconverted, deriving bandwidth expansion control signals from vertical and horizontal transitions, respectively, in the luminance signal components, bandwidth expanding the upconverted chrominance signal components in both the vertical and horizontal dimensions, and controlling the bandwidth expansion of the upconverted chrominance signal components with said control signals in both the vertical and horizontal dimensions.

5. A method for enhancing the vertical and horizontal chrominance transitions of a digital component video signal derived from a digital component video signal by downconverting the chrominance signal components to a lower vertical and horizontal sampling rate, comprising upconverting the chrominance signal components to a higher vertical and horizontal sampling rate commensurate with the sampling rate of the video signal from which the video signal chrominance components were downconverted, deriving bandwidth expansion control signals from vertical and horizontal transitions, respectively, in the upconverted chrominance signal components, bandwidth expanding the upconverted chrominance signal components in both the vertical and horizontal dimensions, and controlling the bandwidth expansion of the upconverted chrominance signal components with the chrominance-derived control signals when a vertical or horizontal chrominance transition occurs.

6. A method for enhancing the vertical and horizontal chrominance transitions of a digital component video signal derived from a digital component video signal by downconverting the chrominance signal components to a lower vertical and horizontal sampling rate, wherein the digital component video signal has luminance components having the same sampling rate as that of the digital component video signal from which it was derived, comprising upconverting the chrominance signal components to a higher vertical and horizontal sampling rate commensurate with the sampling rate of the video signal from which the video signal chrominance components were downconverted, deriving bandwidth expansion control signals from vertical and horizontal transitions, respectively, in the luminance signal components, deriving bandwidth expansion control signals from vertical and horizontal transitions in the upconverted chrominance signal components, bandwidth expanding the upconverted chrominance signal components in both the vertical and horizontal dimensions.

controlling the vertical and horizontal bandwidth expansion of the upconverted chrominance signal components (1) with the luminance-derived control signal when a vertical or horizontal luminance transition occurs, and (2) with the chrominance-derived control signal when a vertical or horizontal chrominance transition occurs in the absence of a respective vertical or horizontal luminance transition.

7. A method according to any one of claims 1, 2, 3, 4, 5 or 6 wherein the digital component video signal is a 4:2:0 format signal derived from a CCIR 601 (4:2:2) format signal.

* * * * *